US007624133B1

(12) United States Patent
Ojalvo

(10) Patent No.: US 7,624,133 B1
(45) Date of Patent: Nov. 24, 2009

(54) AUTOMATIC DETECTION OF BACKUP RECOVERY SETS

(75) Inventor: Howard A. Ojalvo, Shoreview, MN (US)

(73) Assignee: Symantec Operating Corporation, Cupertino, CA (US)

( * ) Notice: Subject to any disclaimer, the term of this patent is extended or adjusted under 35 U.S.C. 154(b) by 299 days.

(21) Appl. No.: 10/864,664

(22) Filed: Jun. 9, 2004

(51) Int. Cl.
  *G06F 17/30* (2006.01)
(52) U.S. Cl. .................................. 707/204; 707/202
(58) Field of Classification Search ............ 707/1, 707/2, 3, 10, 100, 200, 202, 204; 711/162, 711/161; 714/6
See application file for complete search history.

(56) References Cited

U.S. PATENT DOCUMENTS

| 5,991,772 | A | * | 11/1999 | Doherty et al. | ............ 707/202 |
| 6,324,548 | B1 | * | 11/2001 | Sorenson | ............ 707/204 |
| 6,857,053 | B2 | * | 2/2005 | Smith et al. | ............ 711/162 |
| 6,948,038 | B2 | * | 9/2005 | Berkowitz et al. | .......... 711/162 |
| 7,222,133 | B1 | * | 5/2007 | Raipurkar et al. | ........... 707/200 |
| 2003/0074378 | A1 | * | 4/2003 | Midgley et al. | ............. 707/204 |
| 2004/0153761 | A1 | * | 8/2004 | Lee | .............................. 714/15 |

* cited by examiner

*Primary Examiner*—Charles Rones
*Assistant Examiner*—Fariborz Khoshnoodi
(74) *Attorney, Agent, or Firm*—Campbell Stephenson LLP

(57) ABSTRACT

Methods, systems, and apparatus can utilize compositional sets associated with components of a database to link backups of the database taken over time. Such a linkage aids in the selection of backups for restore, assures that all backups used to restore the database are images from a common compositional structure, and aids in increasing the efficiency of restore operations.

16 Claims, 5 Drawing Sheets

| | | |
|---|---|---|
| $t_1$ | 100, 110, 110(a), 110(b), 120 | |
| $t_2$ | 100, 110, 110(a), 110(b), 120 | |
| $t_3$ | 100, 110, 110(a), 110(b), 120 | |
| $t_4$ | 100, 110, 110(a), 110(b), 120 | $CS(D)_1$ |
| | | |
| $t_5$ | 100, 110, 110(a), 110(b), 120, 120(a), 120(b) | |
| $t_6$ | 100, 110, 110(a), 110(b), 120, 120(a), 120(b) | |
| $t_7$ | 100, 110, 110(a), 110(b), 120, 120(a), 120(b) | |
| $t_8$ | 100, 110, 110(a), 110(b), 120, 120(a), 120(b) | $CS(D)_2$ |
| | | |
| $t_9$ | 100, 110, 110(a), 110(b), 120, 120(a), 120(b), 130 | |
| $t_{10}$ | 100, 110, 110(a), 110(b), 120, 120(a), 120(b), 130 | |
| $t_{11}$ | 100, 110, 110(a), 110(b), 120, 120(a), 120(b), 130 | |
| $t_{12}$ | 100, 110, 110(a), 110(b), 120, 120(a), 120(b), 130 | $CS(D)_3$ |
| | | |
| $t_{13}$ | 100, 110, 110(b), 120, 120(a), 120(b), 130 | |
| $\vdots$ | | $CS(D)_4$ |

Figure 2

AUTOMATIC DETECTION OF BACKUP RECOVERY SETS

FIELD OF THE INVENTION

The present invention relates to data protection in a networked or stand-alone computing environment, and particularly to systems and methods for automatically selecting sets of backups to restore data, such as that found in relational databases.

BACKGROUND OF THE INVENTION

The ever increasing reliance on information and the computing systems that produce, process, distribute, and maintain such information in its myriad forms continues to put great demands on techniques for data protection. Simple systems providing periodic backups of a computer system's data have given way to more complex and sophisticated data protection schemes that take into consideration a variety of factors including: the wide variety of computing devices and platforms encountered, numerous different types of data that must be protected, the speed with which data protection operations must be executed, and the flexibility demanded by today's users.

Of particular interest to many businesses are databases, for which availability to the users can be mission critical. If, for example, a bank cannot process customer transactions (deposits, payments, transfers, etc.) because of a database failure, a customer may be unable to accomplish its business. Likewise, if an airline is unable to book reservations, customers may be lost and its planes may fly empty. These examples illustrate the need to quickly and efficiently be able to restore functionality to applications accessing computer data.

Information Systems managers perform backup and restore operations to protect critical data. The backup and restore process allows for the restoration of data over a wide range of potential system problems, including media failure, user errors, or loss of database servers. In addition, backing up and restoring data is useful for other types of problems not related to system failure, such as moving or copying a database from one server to another.

Backing up data makes a copy of the data that can be used to restore the data. For databases, there may be several different types of backups of the database data, such as full, differential, and component backups. A full backup is a copy of all the data within a database at a particular point and time. A differential backup is a backup of the differences in content between the current time and the last full or differential backup, and is typically implemented by only backing up changed data. There are two types of differentials: cumulative and non-cumulative. A cumulative differential backup includes all of the changes since the last full backup. A non-cumulative differential backup only includes changes since the last differential backup.

Backups are not restricted to the complete database but also may be focused on selected components of the database. Components may be hierarchical portions of the data as demonstrated in FIG. 1(a). In FIG. 1(a), the data 100 is divided into two components: 110 and 120. Those components are then broken down into subcomponents, e.g., 110(a) and 110(b). The data can be broken down into a hierarchy consisting of the quantity and number of levels of components as make logical sense for an application using the data. A backup scheme may be devised in which each component is backed up separately on its own time schedule, which may be based upon a number of factors, including for example, criticality of the data, frequency of data modification or addition, and location of the particular component within a network. Examples of component structure in a database environment include file groups and files as in Microsoft SQL Server™ and table spaces and file components in Oracle® databases.

During a database backup, components of the database are copied, including any needed portions of the transaction log. The transaction log is a serial record of modifications that have occurred in a database and includes information such as which transaction performed each modification. The transaction log typically is used in restore operations to roll forward completed transactions and to roll back or undo uncompleted transactions. A transaction log backup typically records only the changes that have occurred in the transaction log after a prescribed synchronization point. It is not an actual backup of the database itself.

In the event of a data failure, that data should quickly and efficiently be restored to a desired state and time. In general, a restore operation involves the application of one or more backups of, for example, a database. Restoring a database backup returns the database to its state when the backup was created. Any incomplete transactions in the database backup are typically rolled back to ensure that the database remains internally consistent. Restoring a transaction log backup can reapply all completed transactions that are in the transaction log to the database. When applying a transaction log backup, the transaction log is traversed, and all transactions in the log are rolled forward. When the end of the transaction log is reached, the database is restored to the state in which it was when the transaction log backup operation began. The restore operation then rolls back all transactions that were incomplete when the backup operation started.

Database backups and transaction log backups are used together to restore a database to its state at a point and time at which a failure occurred. Typically, this involves working backwards from the desired restore time through many incremental or full backups, along with the transaction log, to completely recreate the database as of the desired time. In a complex environment where component backups are used, restore operations also involve determining the complete set of backups of the various components taken at various times. In order to ensure consistency of the data, it is desirable that the compositional structure of the database be consistent throughout all the backup sets used to recover the data.

Accordingly, it is desirable to have an efficient method of determining the appropriate set of backups that correspond to a consistent collection of data components when restoring data to a particular state.

SUMMARY OF THE INVENTION

Methods, systems, and apparatus have been discovered that can increase the efficiency of database backup and restore operations by linking backups made during a period of time when there was a common compositional structure of a database. A backup utility determines, at the time of a backup, whether the current compositional structure of the database has changed since a previous backup. If there has been no change, then the current backup is linked to the compositional set corresponding the previous backup. If there has been a change, then the current backup is linked to a new compositional set. A restore utility determines what compositional set was existent at the desired restore time for the desired component of the database, and chooses only backups linked to that compositional set to effect the restore. This linkage of database component backups to compositional sets aids in the selection of backups for restore, assures that all backups used to restore the database are images from a common compositional structure, and allows improved efficiency of restore operations by streamlining the backup catalog so that substantially similar compositional structures need be recorded only one time.

Accordingly, one aspect of the present invention provides a method for restoring a database. An identifier of a component of a database to be restored is received. The database component could be any piece of a database or the entire database. The database corresponding to the identifier has a compositional structure of one or more components having relationships therebetween. A set of backups of components of the database corresponding to the identifier are selected. Each backup in the set of backups contains at least a portion of the identified component to be restored. Further, the compositional structure of the database at a time associated with the creation of each backup in the set of backups is substantially the same as the compositional structure of the database at a time associated with the identifier of the component of the database to be restored. At least one backup from the set of backups is identified from which the desired component of the database may be restored.

Another aspect of the invention provides a method for backing up databases. An identifier of one or more components of a database to be backed up is received. The database has a compositional structure of one or more components having relationships therebetween. A current compositional structure of the database is determined. Additionally, a compositional structure of the database at a time associated with a previous backup of one or more components of the database is determined. When the current compositional structure is substantially the same as the prior compositional structure, then the current compositional structure is grouped with the prior compositional structure. When the current compositional structure is not substantially the same as that of the prior compositional structure, then a group of compositional structures is created corresponding to the current compositional structure.

Still another aspect of the invention provides an apparatus including a means for receiving an identifier of a component of a database to be restored, a means for selecting a set of backups of components of that database, and a means for identifying at least one backup from the set of backups from which the desired component of the database may be restored. Each backup in the set of backups contains at least a portion the identified component of the database, and the compositional structure of the database at the time of creation of each backup is substantially the same as the compositional structure of the database at the time associated with the identifier of the component to be restored.

Another aspect of the invention provides another apparatus including a means for receiving an identifier of one or more components of a database to be backed up, a means for determining a current compositional structure of the database, a means for determining a prior compositional structure of the database at a time associated with the creation of a previous backup, a means for grouping the current compositional structure with the prior compositional structure when the current and prior compositional structures are substantially the same, and a means for creating a group of compositional structures corresponding to the current compositional structure when the current and prior compositional structures are not substantially the same.

In yet another aspect of the invention, a system includes an administrative interface, a backup selection module, and a restore module to recover data corresponding to an identifier of a component of a database to be restored. The backup selection module is configured to receive the identifier of a component of a database to be restored, to select a set of backups of components of the database corresponding to the identifier, and to identify at least one backup from the set of backups from which the component corresponding to the identifier may be restored.

In another system aspect of the invention is included an administrative interface, and a compositional structure grouping module. The compositional structure grouping module is configured to receive an identifier of one or more components of a database to be backed up, to determine a current compositional structure of the database, to determine a prior compositional structure of the database at a time associated with a previous backup, to group the current compositional structure with the prior compositional structure if they are substantially the same, and to create a new group of compositional structures if the current compositional structure is not substantially the same as the prior compositional structure.

The foregoing is a summary and thus contains, by necessity, simplifications, generalizations, and omissions of detail. Consequently, those skilled in the art will appreciate that the summary is illustrative only and is not intended to be in any way limiting. As will also be apparent to one of skill in the art, the operations disclosed herein may be implemented in any number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired to referring to the following description and the accompanying drawings, in which like reference numbers indicate like features.

FIG. 2 is an illustration demonstrating changes of compositional sets of data over time.

DETAILED DESCRIPTION

The following sets forth a detailed description of at least the best contemplated mode for carrying out the one or more processes described herein. The description is intended to be illustrative and should not be taken as limiting. Rather, any number of variations may fall within the scope of the invention which is defined in the claims following the description.

Figure 1A:
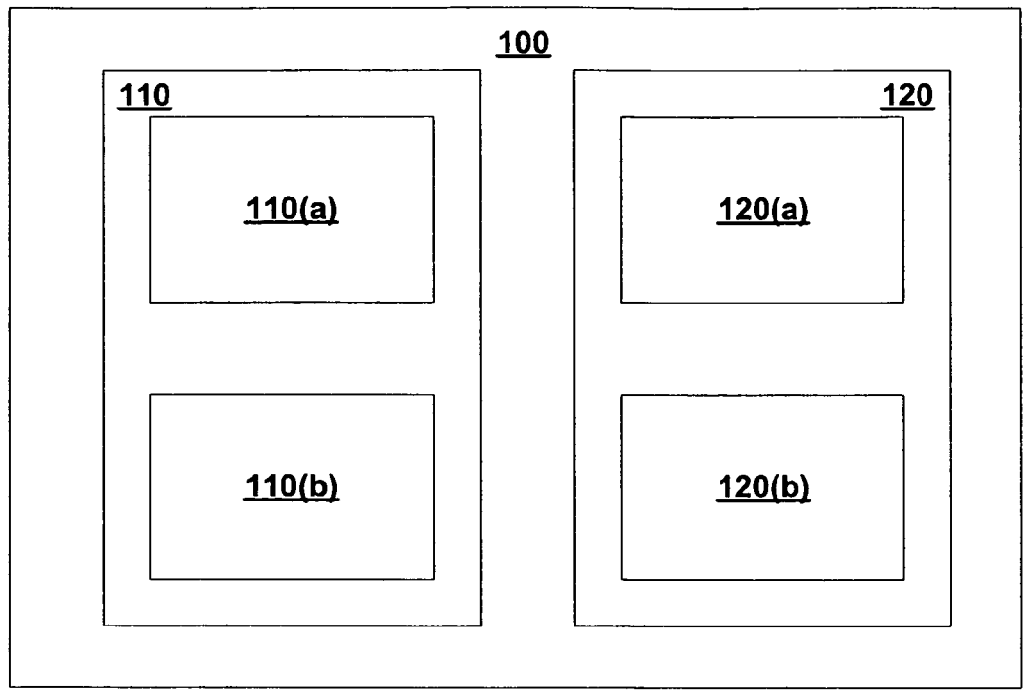
FIG. 1(a) is a simplified diagram of data arranged in a compositional hierarchy, dividing the data into two main sections and into subsequent subsections.

Coupled data, such as that found in a relational database, can be broken down into a hierarchy that corresponds logically to the application for which the data is used. FIG. 1(a) is a simplified diagram demonstrating such a hierarchical structure of data components. The data 100 is broken down into two main subcomponents: 110 and 120. Those two components may be broken down into subcomponents, as illustrated by blocks 110(a), 110(b), 120(a), and 120(b). It should be noted that there may be data overlap between components, such as between 110(a) and 110.

Figure 1B:
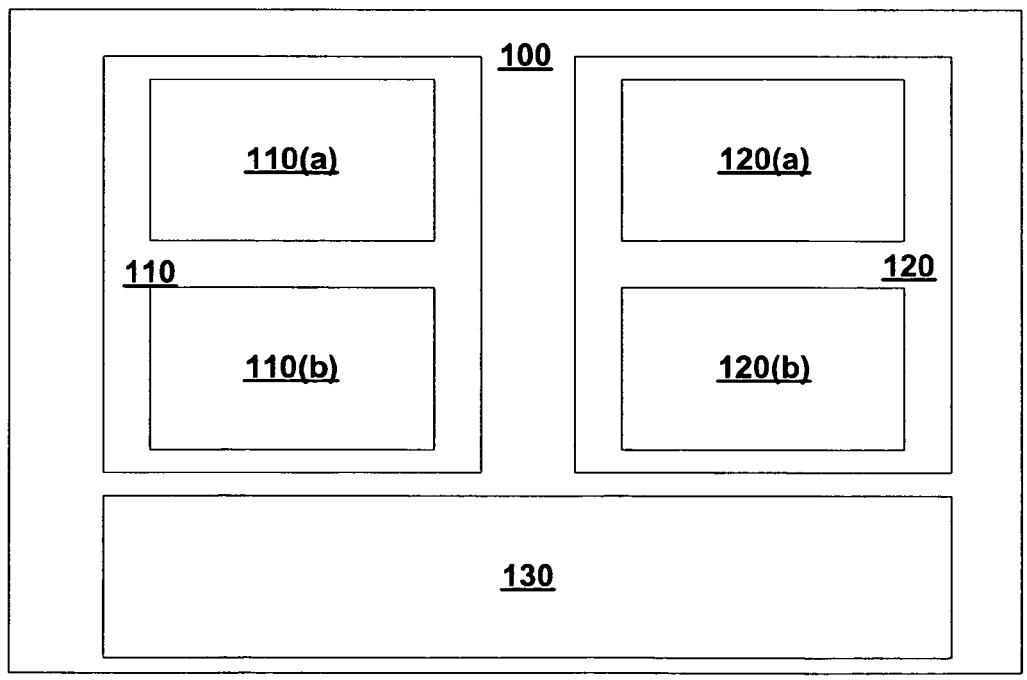
FIG. 1(b) is a simplified diagram of the same data but divided into three main subsections.

As needs change, it may be desirable to alter the compositional structure of the data. As demonstrated in FIG. 1(b) an additional component of data labeled 130 has been created within data 100. It should be understood that a compositional change of data components could be the addition of new sub-components or the subtraction of existing components within any level of the hierarchical structure. These compositional changes may represent changes in data relationships, and therefore are important markers through which one may relate the condition of the data.

At any time, a backup of any component of the data could be taken. For example, a full backup of the complete data set would be a backup of component 100. At a subsequent time, an incremental backup of 110(a) could be performed, followed by a non-cumulative differential backup of 120, etc. These backups of any data component are component backups.

FIG. 2 demonstrates the changing compositional structure of a set of data over time through a series of component inventories of that data taken at times $t_n$. At time $t_1$, the existent data components are 100, 110, 110(a), 110(b), and 120. This set of data components continues through time $t_4$. At time $t_5$, when the inventory is taken, it is found that data components 120(a) and 120(b) are additionally present. Thus, between time $t_4$ and $t_5$, those components were created and the compositional structure of the data changed. The result is that the compositional set representing the structure containing only components 100, 110, 110(a), 110(b), and 120 closed between times $t_4$ and $t_5$. This first compositional set is represented by $CS(D)_1$. The new compositional set, $CS(D)_2$, including 120(a) and 120(b) exists and remains static in component structure through time $t_8$. Subsequently, a new data component 130 is added to the data structure, again changing the compositional structure. That change closes the $CS(D)_2$ compositional set. That compositional structure, including now the new component 130, remains static through time $t_{12}$, after which the data component 110(a) is removed. The compositional set $CS(D)_3$ is then closed for times $t_9$ through $t_{12}$ and new compositional set $CS(D)_4$ begins. $CS(D)_4$ will continue until an inventory of the data reveals another compositional change. Each $CS(D)_m$ corresponds to a compositional set of data that is static in structure; that is, the gross structure is the same, even though data within those structures may change.

At each time $t_n$ discussed above, a backup of the data may be conducted. Such a backup can be conducted in whatever manner and of whatever type that would normally be conducted for the data structure being backed up. For example, full backups could be done of the data, full backups could be done of individual data components, or cumulative or non-cumulative differential backups could be conducted of one or more of the individual components. The choice of the type of backup is governed by considerations that typically govern such a decision, i.e., criticality of the data, frequency of data modification, etc.

Figure 3:
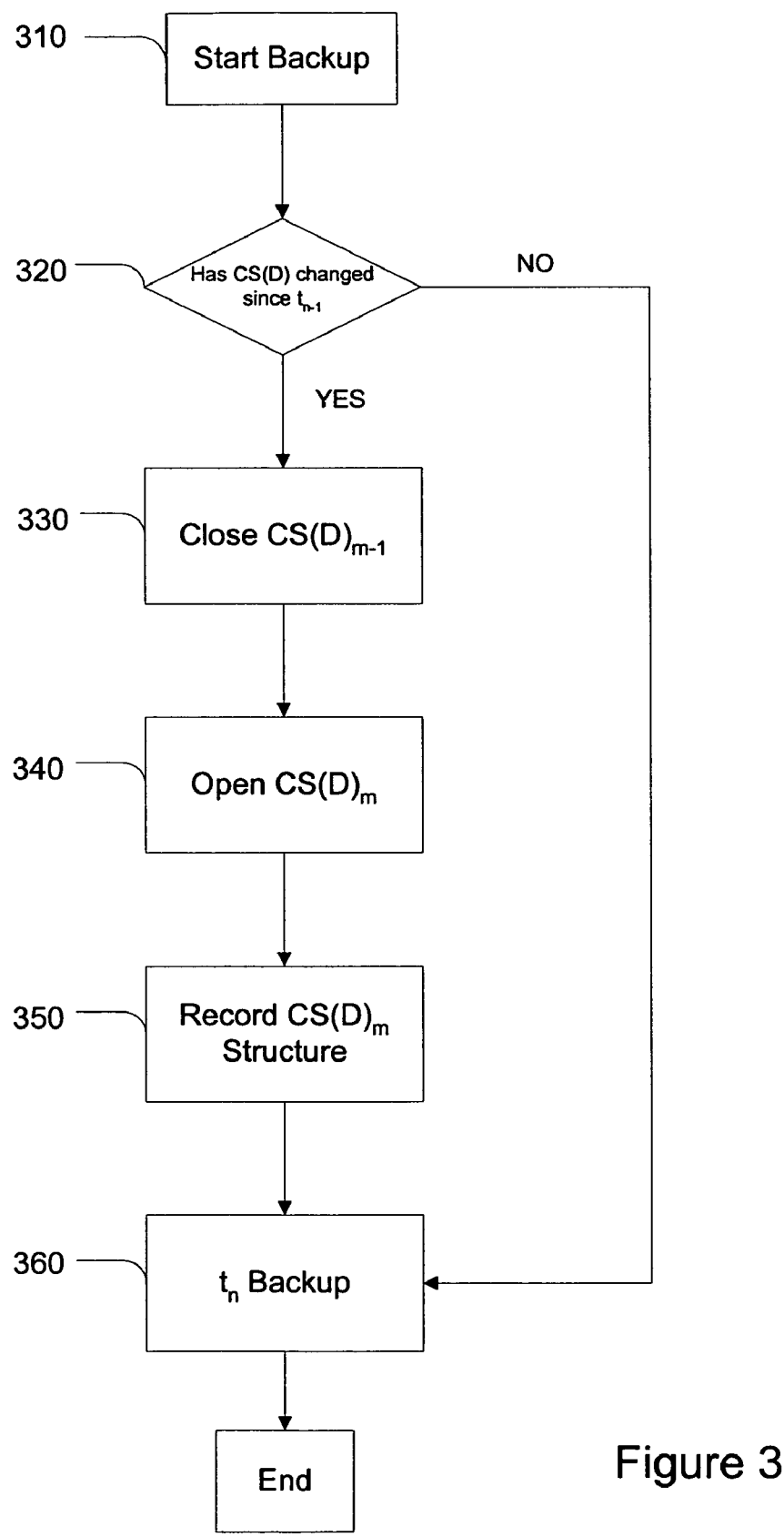
FIG. 3 is a simplified flow diagram for a backup methodology usable in the current invention.

In order to implement the present invention, the backup facility should additionally determine and record whether a compositional change to the data occurred between the backup at time $t_n$, and the time of the immediately preceding backup, $t_{n-1}$. One way to accomplish this is demonstrated in FIG. 3, where the backup procedure is begun (310) and then it is determined whether the compositional set CS(D) has changed since $t_{n-1}$ (320). If there has been no change, then the facility proceeds with the backup at time $t_n$ (360) and the backup would then be linked to the compositional set. If there has been a change to the compositional set, then a record is made of the closure of the previous compositional set $CS(D)_{m-1}$ (330), and a new compositional set $CS(D)_m$ is opened (340). A record may be made of the new compositional structure of $CS(D)_m$ (350). Subsequently, the requested backup operation (360) proceeds and the backup is linked to the new compositional set.

Determination of whether a new compositional set is present may be accomplished through any facility for flagging compositional change that is incorporated into the software maintaining the data. For example, a database may be queried as the structure of its instances, partitions, table spaces, file groups or files through an appropriate set of SQL commands. The results could then be compared with the results of a similar query made at the time of the immediately previous backup. A compositional change could also be detected by reviewing the create dates of the files containing the data and comparing those dates with the last backup date, or an inventory of file names containing the data could be compared with a similar inventory taken at the time of the last backup. These examples are not intended to limit the number of ways in which one could determine whether a compositional change has occurred since time $t_{n-1}$. One familiar with a particular set of data or means of maintaining and updating that data will understand that any tool contained within that software that is capable of reviewing the data structure may be used.

In one embodiment of the invention, one may record the complete compositional structural of the data at the time of compositional change in order to eliminate the need to make a complete record at the time of every backup, thus streamlining a backup catalog containing descriptions of the backups. Delimiting the existence of a particular compositional set within time also ensures that the objects selected as constituents of a backup set were all created in a historical period in which the database composition was relatively static. All backup data images that fall within the timeframe of a particular compositional set are linked through the fact that the database composition existent at the time of those backups was static.

In another embodiment, the compositional structure is not necessarily recorded separately. Instead, one need only determine that a compositional change has occurred since the previous backup in order to track the closure of a compositional set.

Figure 4:
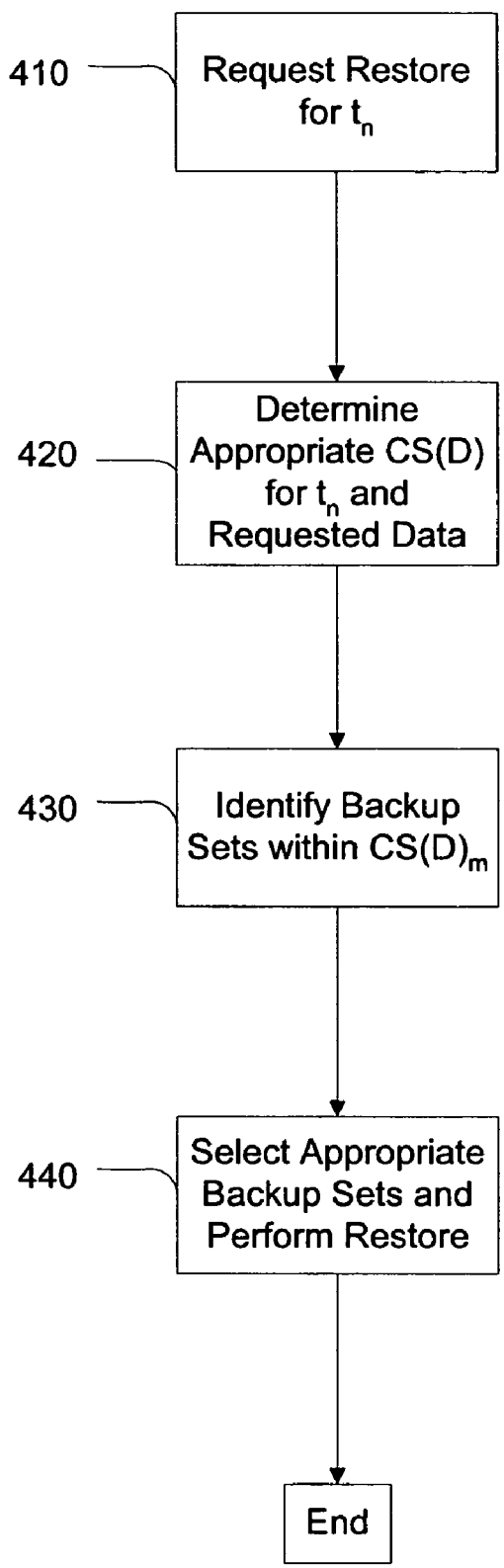
FIG. 4 is a simplified flow diagram for a restore methodology usable in the claimed invention.

Linking backups to compositional sets aids in automating selection of backups for recovery of data, assures that all backups used to restore the database are images from a common compositional structure, and allows improved efficiency of restore operations by streamlining the backup catalog so that substantially similar compositional structures need be recorded only one time. Under the present scheme, when backed up data needs to be restored to its state at a particular time $t_n$, one should determine the appropriate compositional set of the data desired to be restored. FIG. 4 is a flow diagram demonstrating the steps for restore. A request is made at 410 to restore the data to its condition at time $t_n$. The record of the various compositional sets is examined to determine the appropriate $CS(D)_m$ for $t_n$ and the data desired to be restored (420). Once the appropriate $CS(D)_m$ is determined, then the available backup sets linked to that compositional set may be identified (430). The data may then be appropriately restored to the requested state in time using all or some of the backups linked to that compositional set through any appropriately chosen restore algorithm (440). The backups that may be used for restore may contain an entire component of the database identified for restore, or some portion or sub-component of an identified component. For example, a restore operation may use a full backup at $t_{n-3}$ followed by a series of cumulative differential backups recorded at times $t_{n-2}$ and $t_{n-1}$, followed by use of a transaction log to bring the data to its condition at a time $t_n$. Other restore methodologies may be used in the present scheme, as the disclosed method of delimiting time by compositional sets is not restricted to any particular restore or backup operation.

This scheme improves efficiency and data consistency by ensuring that all objects selected as constituents of a set of backups were created in a historical period when the compositional structure of the database was static. This method also reduces the universe of appropriate backups. Efficiency may be further enhanced by recording the structure of the compositional set only once, thereby streamlining the backup catalog and making each backup shorter.

Each of the blocks in the flow diagrams presented herein may be executed by a module (e.g., a software module) or a portion of a module or a computer system user. Thus, the above described method, the operations thereof and modules therefor may be executed on a computer system with one or more processors configured to execute the operations of the method or may be executed from computer-readable media. The computer-readable medium can be any one of an electronic storage medium, a magnetic storage medium, and an optical storage medium. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Although the examples described typically illustrate conventional application software, other examples might include web-based applications. In general, any type of software implementation suitable for client/server computing environment can be used to implement the present invention.

Figure 5:
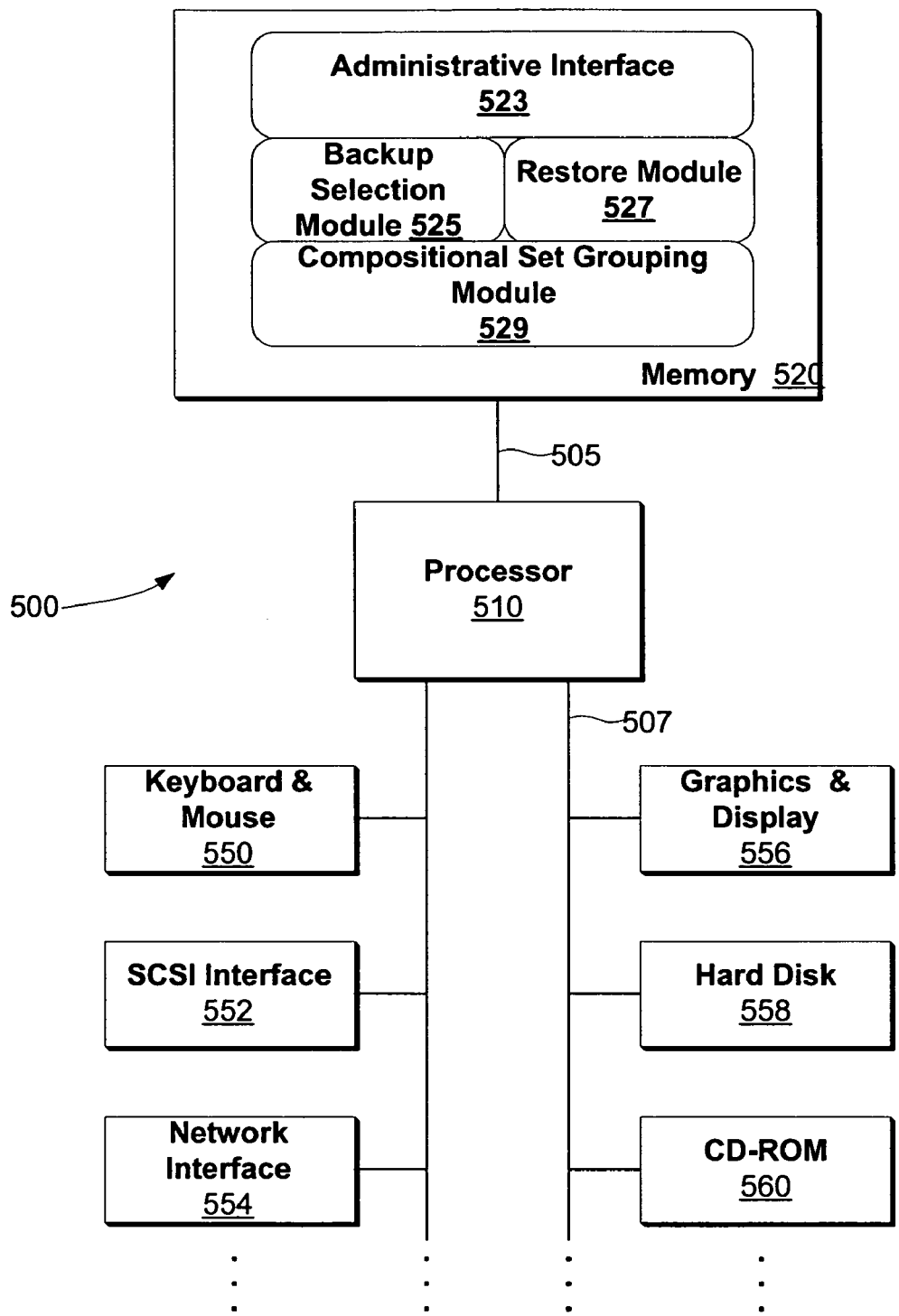
FIG. 5 is a simplified block diagram of a computer system for implementing the techniques of the present invention.

FIG. 5 illustrates a block diagram of a computer system 500 for implementing the techniques of the present invention. Computer system 500 includes a processor 510 and a memory 520 coupled together by communications bus 505. Processor 510 can be a single processor or a number of individual processors working together. Memory 520 is typically random access memory (RAM), or some other dynamic storage device, and is capable of storing instructions to be executed by the processor, e.g., software 523, 525, 527, and 529. Memory 520 is also used for storing temporary variables or other intermediate information during the execution of instructions by the processor 510.

Those having ordinary skill in the art will readily recognize that the techniques and methods discussed below can be implemented in software using a variety of computer languages, including, for example, computer languages such as C, C++, C#, and Java. If implemented in a web-based client/server environment, computer languages such as HTML, XML, JavaScript, VBScript, JScript, PHP, Perl; development environments/tools such as Active Server Pages (ASP), JavaServer Pages (JSP), and ColdFusion; and interface tools such as the Common Gateway Interface (CGI) can also be used. Additionally, software 523, 525, 527, and 529 can be provided to the computer system via a variety of computer readable media including electronic media (e.g., flash memory), magnetic storage media (e.g., hard disk 558, a floppy disk, etc.), and optical storage media (e.g., CD-ROM 560).

Computer system 500 also includes devices such as keyboard & mouse 550, SCSI interface 552, network interface 554, graphics & display 556, hard disk 558, and CD-ROM 560, all of which are coupled to processor 510 by communications bus 507. It will be apparent to those having ordinary skill in the art that computer system 500 can also include numerous elements not shown in the figure, such as additional storage devices, communications devices, input devices, and output devices, as illustrated by the ellipsis shown. An example of such an additional computer system device is a fibre channel interface.

Although the present invention has been described with respect to a specific preferred embodiment thereof, various changes and modifications may be suggested to one skilled in the art, and it is intended that the present invention encompassed such changes and modifications which fall within the scope of the appended claims.

What is claimed is:

1. A computer-implemented method, stored as instructions in a memory and executed by a processor, said method comprising:

receiving an identifier of a component of a database to be restored, wherein
the database corresponding to the identifier comprises a compositional structure of one or more components wherein said components have relationships therebetween, and
the identifier comprises a target time period for the restored component;

determining the compositional structure of the database at the target time period;

selecting a compositional set of backups of the database from a plurality of compositional sets of backups, wherein
each of the compositional sets of backups comprises an identified grouping of backups of one or more components of the database created during a time period at which the compositional structure of the database was the same,
the identification of the grouping of backups is performed at the time of each backup comprising a compositional set of backups, wherein
said identification comprises
inspecting one or more of the names of all files associated with the database comprising the data to backed up and the creation dates of all those files in order to determine whether any of the files were created since the previous backup of one or more components of the database, and
establishing a current compositional structure as not substantially the same as that of a prior compositional structure when any of the files were created since the previous backup of one or more components of the database, and
the selected compositional set of backups comprises backups created during a time period at which the compositional structure of the database is substantially the same as the determined compositional structure; and identifying at least one backup from the compositional set of backups from which the component of the database corresponding to the identifier is recovered.

2. The computer-implemented method of claim 1 further comprising:
recovering data corresponding to the identifier.

3. The computer-implemented method of claim 1, wherein the identifier comprises the date.

4. The computer-implemented method of claim 1, wherein the identifier comprises at least one of a filename, a database identifier, a database tablespace identifier, a database filegroup identifier, a database file identifier, a database partition identifier, and a database instance identifier.

5. The computer-implemented method of claim 1 encoded in a computer readable medium as instructions executed on a processor, the computer readable medium being one of an electronic storage medium, a magnetic storage medium, and an optical storage medium.

6. A computer-implemented method, stored as instructions in a memory and executed by a processor, said method comprising:
   receiving an identifier of one or more components of a database to be backed up, wherein
      the database corresponding to the identifier comprises a compositional structure of one or more components wherein said components have relationships therebetween;
   determining a current compositional structure of the database corresponding to the identifier;
   determining a prior compositional structure of the database corresponding to the identifier at a time associated with the creation of a previous backup of one or more components of the database;
   determining whether there is substantial similarity between the current compositional structure and the prior compositional structure, wherein said determining substantial similarity comprises
      inspecting one or more of the names of all files comprising the database corresponding to the identifier and the creation dates of those files in order to determine whether any of the files were created since the previous backup of one or more components of the database; and
      establishing the current compositional structure as not substantially the same as that of the prior compositional structure when any of the files comprising the database were created since the previous backup of one or more components of the database;
   if the current compositional structure is substantially the same as the prior compositional structure, including a backup of the one or more components with a first set of backups comprising the previous backup, wherein
      said including comprises linking the backup of the one or more components with a first compositional set identifier associated with the first set of backups; and
   if the current compositional structure is not substantially the same as the prior compositional structure, creating a second set of backups corresponding to the current compositional structure comprising the backup of the one or more components, wherein
      said creating the second set of backups comprises associating the backup of the one or more components with a second compositional set identifier.

7. The computer-implemented method of claim 6 further comprising:
   comparing the current compositional structure with a record of the prior compositional structure.

8. The computer-implemented method of claim 6 wherein the identifier comprises one or more of the following:
   all databases to be backed up,
   all database instances to be backed up,
   all database partitions to be backed up,
   all database tablespaces to be backed up,
   all database filegroups to be backed up, and
   all database files to be backed up.

9. The computer-implemented method of claim 6 encoded in a computer readable medium as instructions executed on a processor, the computer readable medium being one of an electronic storage medium, a magnetic storage medium, and an optical storage medium.

10. An apparatus comprising:
   a processor coupled to a communications bus;
   means for receiving, via the communications bus, an identifier of a component of a database to be restored, wherein
      the database corresponding to the identifier comprises a compositional structure of one or more components wherein said components have relationships therebetween, and
      the identifier comprises a target time period for the restored component;
   means for determining the compositional structure of the database at the target time period;
   means for selecting a compositional set of backups of the database from a plurality of compositional sets of backups, wherein
      each of the compositional sets of backups comprises an identified grouping of backups of one or more components of the database created during a time period at which the compositional structure of the database was the same,
      the identification of the grouping of backups is performed at the time of each backup comprising a compositional set of backups, wherein
         said identification comprises
            inspecting one or more of the names of all files associated with the database comprising the data to backed up and the creation dates of all those files in order to determine whether any of the files were created since the previous backup of one or more components of the database, and
            establishing a current compositional structure as not substantially the same as that of a prior compositional structure when any of the files were created since the previous backup of one or more components of the database, and
      the selected compositional set of backups comprises backups created during a time period at which the compositional structure of the database is substantially the same as the determined compositional structure; and
   means for identifying at least one backup from the set of backups from which the component of the database corresponding to the identifier is recovered.

11. The apparatus of claim 10 further comprising:
means for recovering data corresponding to the identifier.

12. An apparatus comprising:
a processor coupled to a communications bus;
means for receiving, via the communications bus, an identifier of one or more components of a database to be backed up, wherein
   the database corresponding to the identifier comprises a compositional structure of one or more components wherein said components have relationships therebetween;
means for determining a current compositional structure of the database corresponding to the identifier;
means for determining a prior compositional structure of the database corresponding to the identifier at a time associated with the creation of a previous backup of one or more components of the database;

means for determining whether there is substantial similarity between the current compositional structure and the prior compositional structure, wherein said means for determining substantial similarity comprises means for inspecting one or more of the names of all files comprising the database corresponding to the identifier and the creation dates of those files in order to determine whether any of the files were created since the previous backup of one or more components of the database; and means for establishing the current compositional structure as not substantially the same as that of the prior compositional structure when any of the files comprising the database were created since the previous backup of one or more components of the database;

means for including a backup of the one or more components with a first set of backups comprising the previous backup if the current compositional structure is substantially the same as the prior compositional structure wherein said means for including comprises means for linking the backup of the one or more components with a first compositional set identifier associated with the first set of backups; and means for creating a second set of backups corresponding to the current compositional structure comprising the backup of the one or more components if the current compositional structure is not substantially the same as the prior compositional structure, wherein said means for creating the second set of backups comprises means for associating the backup of the one or more components with a second compositional set identifier.

13. The apparatus of claim 12, further comprises:
means for comparing the current compositional structure with a record of the prior compositional structure.

14. The apparatus of claim 12 wherein said means for determining a current compositional structure of the database corresponding to the identifier comprises:
means for acquiring the identification of all databases to be backed up.

15. A computer system comprising stored instructions in a memory executed by a processor implementing:
an administrative interface configured to provide user access;
a backup selection module coupled to the administrative interface and configured to:
receive, from the administrative interface, an identifier of a component of a database to be restored, wherein
the database corresponding to the identifier comprises a compositional structure of one or more components wherein said components have relationships therebetween, and
the identifier comprises a target time period for the restored component;
determine the compositional structure of the database at the target time period;
select a compositional set of backups of the database from a plurality of compositional sets of backups, wherein
each of the compositional sets of backups comprises an identified grouping of backups of one or more components of the database created during a time period at which the compositional structure of the database was the same,
the identification of the grouping of backups is performed at the time of each backup comprising a compositional set of backups, wherein said identification comprises
inspecting one or more of the names of all files associated with the database comprising the data to backed up and the creation dates of all those files in order to determine whether any of the files were created since the previous backup of one or more components of the database, and
establishing a current compositional structure as not substantially the same as that of a prior compositional structure when any of the files were created since the previous backup of one or more components of the database, and
the selected compositional set of backups comprises backups created during a time period at which the compositional structure of the database is substantially the same as the determined compositional structure; and
identify at least one backup from the set of backups from which the component of the database corresponding to the identifier is recovered; and
a restore module configured to recover data corresponding to the identifier.

16. A computer system comprising stored instructions in a memory executed by a processor implementing:
an administrative interface operable to provide user access;
a compositional structure grouping module coupled to the administrative interface and configured to:
receive, from the administrative interface, an identifier of one or more components of a database to be backed up, wherein
the database corresponding to the identifier comprises a compositional structure of one or more components wherein said components have relationships therebetween;
determine a current compositional structure of the database corresponding to the identifier;
determine a prior compositional structure of the database corresponding to the identifier at a time associated with the creation of a previous backup of one or more components of the database;
determine whether there is substantial similarity between the current compositional structure and the prior compositional structure wherein said determining substantial similarity comprises
inspecting one or more of the names of all files comprising the database corresponding to the identifier and the creation dates of those files in order to determine whether any of the files were created since the previous backup of one or more components of the database; and
establishing the current compositional structure as not substantially the same as that of the prior compositional structure when any of the files comprising the database were created since the previous backup of one or more components of the database;
include a backup of the one or more components with a first set of backups comprising the previous backup if the current compositional structure is substantially the same as the prior compositional structure, wherein
said being configured to include comprises being further configured to link the backup of the one or more components with a first compositional set identifier associated with the first set of backups; and create a second set of backups corresponding to the current compositional structure comprising the backup of the one or more components if the current compositional structure is not substantially the same as the prior compositional structure, wherein said being configured to create the second set of backups comprises being further configured to associate the backup of the one or more components with a second compositional set identifier.

* * * * *